United States Statutory Invention Registration [19]

[11] Reg. Number: H257

Barditch et al. [43] Published: Apr. 7, 1987

[54] DRY POWDER AEROSOLIZER

[75] Inventors: Irving F. Barditch, Baltimore; Ronald M. Rauer, Darlington, both of Md.

[73] Assignee: The United States of America as represented by the Secretary of the Army, Washington, D.C.

[21] Appl. No.: 891,664

[22] Filed: Aug. 1, 1986

[51] Int. Cl.[4] ..... B05B 7/14; B05B 9/00

[52] U.S. Cl. ..... 239/124; 239/143; 239/325

*Primary Examiner*—John F. Terapane
*Assistant Examiner*—Eric Jorgensen
*Attorney, Agent, or Firm*—Anthony T. Lane; Robert P. Gibson; Edward F. Costigan

[57] ABSTRACT

A dry powder aerosolizer for both dispersing and investigating the properties, behavior and measurement of airborne particles has a cylinder and a piston head dividing the cylinder into first and second sub-chambers. The first sub-chamber contains a quantity of dry powder and the second sub-chamber has an inlet opening in communication with an input flow controller admitting pressurized air flowing into the first sub-chamber about the periphery of the piston head to aerosolize the dry powder. The aerosolized powder exits the aerosolizer through a flow control tube extending through a square shaft to which the piston head is mounted. An opposite end of the square shaft extends through a Pelton turbine wheel to which a tangential flow of pressurized air is introduced from the input flow controller to cause rotation of the piston head. The input flow controller has a critical orifice and a use passage with appropriate valving connecting the orifice to the aerosolizer to provide a motive source of pressurized air to the turbine wheel and a supply of aerosolizing air to the first sub-chamber under constant pressure conditions.

16 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRY POWDER AEROSOLIZER

The invention described herein may be manufactured, used and licensed by and for the government for governmental purpose without the payment to us of any royalties thereon.

TECHNICAL FIELD

The present invention relates generally to dry powder aerosolizers used, for example, in the dispersal and investigation of the properties of dry powder airborne particles. More particularly, the invention relates to a dry powder aerosolizer of simplified design utilizing pressurized air as a motive source for rotating a piston in the aerosolization process.

HISTORY OF THE PRIOR ART

Dry powder aerosolizers are used in the investigation of the properties of dry powder aerosols. Previous efforts to construct dry powder aerosolizers are disclosed, for example, in "Aerosol Technology-Properties, Behavior, and Measurement of Airborne Particles" by William C. Hinds (published by John Wiley & Sons), which have resulted in mechanically complex and difficult to control devices. For example, in one prior art device, a complicated differential gear train is employed to impart relative rotation between a cylinder containing dry powder and a piston formed with scraper blades mounted on a threaded spindle through which compressed air is introduced to aerosolize the powder. Considerable machining is required to manufacture this prior art device and insufficient effort has been carried out to provide for a controlled flow rate of compressed air into the prior art aerosolizer.

A need therefore exists for a dry powder aerosolizer that is relatively simple in design and capable of providing controlled aerosolization flow rates in a non-complex and reliable manner without requiring electrical power.

SUMMARY OF THE INVENTION

It is accordingly one object of the present invention to provide a dry powder aerosolizer that is simple in design and capable of aerosolizing various types of dry powders under controlled flow conditions.

Another object of the invention is to provide an aerosolizer utilizing pressurized air or gas as the only motive fluid for mechanically operating a piston head in rotation and translation used in the aerosolization process to compress the powder while simultaneously rotating the piston/scraper head.

Still another object is to provide an aerosolizer and an associated input flow controller that utilizes the properties of a critical orifice to provide a constant flow rate of pressurized air in the aerosolization process to give minimal upstream pressure variations.

Yet another object is to provide a dry powder aerosolizer in which the remaining contents of dry powder therein may be visually observed.

These and other objects are realized in a preferred embodiment of this invention by a dry powder aerosolizer comprising a hollow body having a chamber formed therein with a piston head dividing the chamber into first and second sub-chambers communicating with each other about the periphery of the piston head. The first sub-chamber is adapted to contain a quantity of dry powder. The piston head is formed with stirring elements, known as scrapers, exposed to the first sub-chamber for stirring the dry powder upon rotation of the piston head.

In accordance with the invention, the piston head is mounted on a shaft carrying a turbine wheel responsive to a motive source of pressurized air for rotating the piston head. A further flow of pressurized air is directed into the second sub-chamber during rotation of the piston head to flow about the periphery of the piston head into the first sub-chamber whereby dry powder stirred up by the stirring elements is aerosolized and directed out of the aerosolizer through outlet means.

The outlet means is preferably a flow control needle tube extending through the square drive shaft and piston head in communication with the first sub-chamber. The turbine wheel is preferably a Pelton turbine wheel having circumferential vanes on the periphery thereof in communication with an inlet providing a tangential flow of pressurized air to rotate the turbine wheel. The shaft is co-rotatable with the turbine wheel by forming the shaft to have a non-circular and preferably square cross-section interfitting with a central square hole in the turbine wheel of corresponding cross-section and sliding therein.

The first sub-chamber is defined between the piston head and an end cap mounted to one end of the aerosolizer. The end cap is preferably formed of transparent material, such as lucite, permitting visual observation of the dry powder within the aerosolizer.

An input flow controller preferably in the form of a fluidic block is provided with a critical orifice communicating with the inlets to the turbine wheel and second sub-chamber, respectively, through a use passage and a pair of outlet passages provided with adjusting valves and a proportioning valve. A source of pressurized air flowing through the critical orifice is divided by the proportioning valve to flow into the use passage and a waste passage having a resistive valve establishing a constant flow and constant resistance condition for creation of constant pressure to the use passage. The use passage permits a flow of pressurized air through the adjusting valves in the outlet passages to provide a motive source of pressurized air flow to the turbine wheel and an aerosolizing flow to the piston head under constant pressure conditions and with only minimal upstream pressure variations.

Still other objects of the present invention will become readily apparent to those skilled in this art from the following description wherein there is shown and described a preferred embodiment of this invention simply by way of illustration of the best modes contemplated for carrying out the invention. As will be realized, the invention is capable of other different embodiments, and its several details are capable of modifications in various, obvious respects, all without departing from the invention. Accordingly, the drawing and description will be regarded as illustrative in nature and not as restrictive.

DESCRIPTION OF THE PREFERRED EMBODIMENT

Figure 1:
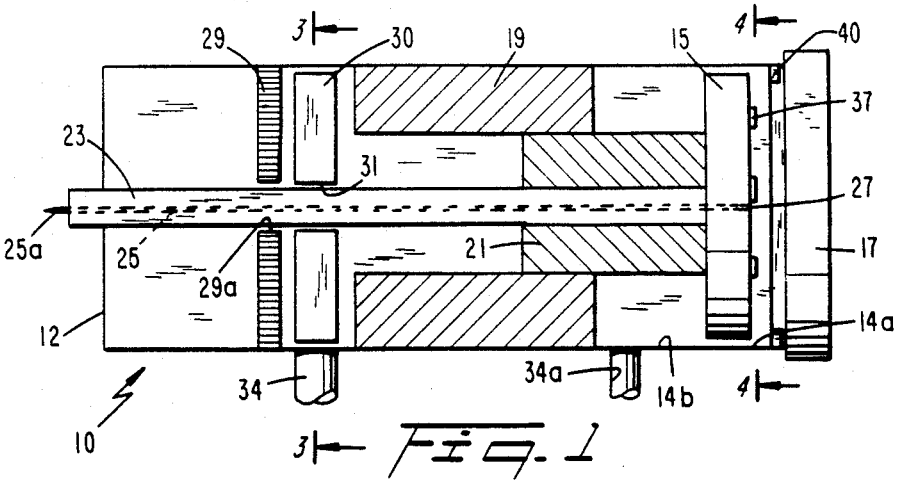
FIG. 1 is a cross-sectional view of a dry powder aerosolizer constructed in accordance with the present invention.

A dry powder aerosolizer 10 in accordance with the present invention comprises a hollow cylindrical vessel 12, preferably of stainless steel, in which are formed at one end thereof first and second sub-chambers 14*a* and 14*b*. The first sub-chamber 14*a* is defined between a piston head 15 and an end cap 17 fixed to one end of vessel 12 and in which is disposed a dry powder (not shown) to be aerosolized. The second sub-chamber 14*b* is formed between piston head 15 (the left-hand side thereof as viewed in FIG. 1) and a cylindrical bearing member 19 preferably formed of self-lubricating material such as Teflon into which there is slidably interfitted a second self-lubricating cylindrical bearing member 21 mounted on a square shaft 23 having piston head 15 fixed to one end thereof. The square shaft 23 has a needle flow control tube 25 extending therethrough in communication with first sub-chamber 14*a* as at 27 through which aerosolized dry powder from first chamber 14*a* exits the aerosolizer 10 at 25*a*.

The left-hand end of square shaft 23 is journaled within a second cylindrical bearing member 29 and is thereby supported within vessel 12 by the first and second bearing members. A Pelton turbine wheel 30 having a central square hole 31 is mounted upon shaft 23 for co-rotation therewith.

Figure 2:
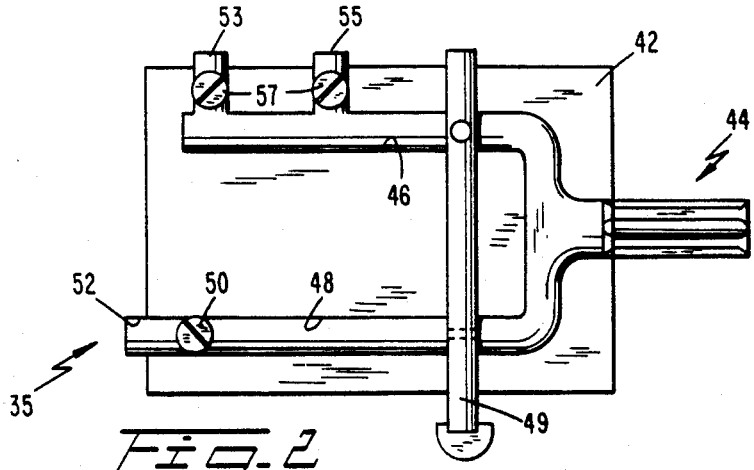
FIG. 2 is a cross-sectional view of an input flow controller used in conjunction with the dry powder aerosolizer of FIG. 1.
Figure 3:
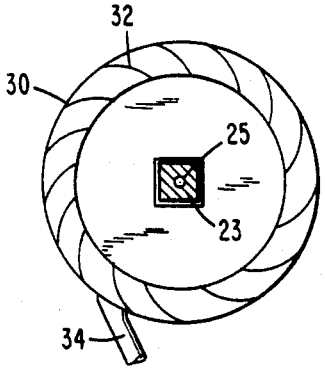
FIG. 3 is a sectional view taken along the line 3—3 of FIG. 1 depicting a turbine wheel utilizing a motive source of pressurized gas for operation of the aerosolizer.
Figure 4:
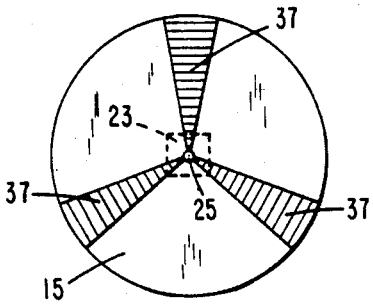
FIG. 4 is a sectional view taken along the line 4—4 of FIG. 1 depicting a piston head rotated by the turbine wheel for stirring up dry powder in the aerosolization process.

With reference to FIG. 3, a tangential flow of pressurized air or gas is provided to turbine wheel 30 and more particularly circumferential vanes 32 peripherally disposed thereon through an inlet passage 34 communicating with an input flow controller 35 (FIG. 2) in the unique manner described below. The input flow controller also provides a pressurized flow of air or gas into second sub-chamber 14*b* through a second inlet passage 34*a* as described infra.

In operation, the tangential flow of pressurized air entering inlet 34 from flow controller 35 rotates turbine 30 which in turn rotates shaft 23 and thereby piston head 15. The right-hand face of piston 15 exposed to first chamber 14*a* containing dry powder includes a series of wedge-like scraping members 37 which agitate the dry powder contents within the first sub-chamber. Simultaneous with rotation of piston head 15, a second flow of pressurized air is admitted into second sub-chamber 14*b* from flow controller 35 through second inlet 34*a* which second flow of air passes into the first sub-chamber 14*a* by flowing under pressure around the periphery of piston head 15. This flow of pressurized air from second sub-chamber 14*b* entrains the powder stirred up by rotating wedges 37 to carry the powder in aerosolized form out of vessel 10 through flow control needle tube 25. The Pelton turbine wheel 30 rotating piston head 15 prevents air channels from being formed within the powder in first sub-chamber 14*a* to ensure a uniform concentration of aerosolized powder exiting the aerosolizer 10.

In addition to rotating turbine wheel 30, the pressurized air supplied from controller 35 through inlet 34 also acts against cylinder bearing 21 to longitudinally advance piston head 15 as the powder in first sub-chamber 14*a* is compressed and reduced in volume during the aerosolization process. The second bearing 29, in addition to supporting square shaft 23, also serves to retain the turbine wheel in fixed position and has a central opening 29*a* of larger diameter than the shaft to channel exhaust air from the turbine.

End cap 17 is preferably formed of transparent material, such as lucite, to permit visual observation of the contents of dry powder remaining in first sub-chamber 14*a*. In addition, a protective ring 40 is disposed within first sub-chamber 14*a* to prevent the piston head 15 from impacting against end cap 17 and possibly causing damage or marring thereto. The self-lubricating bearings 19,21 are preferably formed from Teflon material.

Flow controller 35 used in conjunction with aerosolizer 10 may comprise a fluidic block 42 containing one or more critical orifices 44 through which pressurized air (for example from a compressor not shown) enters the controller. The critical orifice(s) 44 connect to a use passage 46 and a waste passage 48 in which are disposed a proportioning valve 49 dividing the pressurized flow from the critical orifice into the use and waste passages. The waste passage 48 is provided with a resistive valve 50 at its exit 52 which is used to set a constant flow and constant resistance condition and thereby a constant pressure in use passage 46. The use passage 46 has outlet passages 53 and 55 provided with adjusting valves 57 to provide a constant pressure flow of air (which may be adjusted individually with the valves 57) to turbine wheel 30 and second sub-chamber 14*b* through inlets 34 and 34*a*, respectively.

As will be evident from the above disclosure, flow controller 35 is based on a principle which utilizes the properties of the critical orifice. In other words, flow in a passage of suitably restricted dimensions if the upstream pressure is about 1/0.62 the downstream pressure results in a sonic flow which is constant over a range of pressure variations. This is essentially the analog of a constant current source in electrical science. A constant flow through a fixed resistance results in a constant pressure. This allows a constant flow to be converted to a constant pressure. Thus, by properly setting flows as will now occur to one with ordinary skill in the art upon review of the disclosure, the turbine speed and piston pressure can be maintained independent of upstream pressure variations.

It should be apparent from the preceding that this invention may be practiced otherwise than as specifically described and disclosed herein. Modifications may therefore be made to the specific embodiments disclosed here without departing from the scope of this invention and such as intended to be included within the claims appended below.

What is claimed is:

1. A dry powder aerosolizer, comprising:

(a) a hollow body having means for defining a chamber therein;

(b) a piston head dividing said chamber into first and second sub-chambers communicating with each other about the periphery of the piston head, said first sub-chamber adapted to contain a quantity of dry powder, said piston head carrying means exposed to the first sub-chamber for stirring the dry powder upon rotation of the piston head;

(c) means responsive to a motive source of pressurized gas for rotating said piston head; and (d) means for directing a flow of pressurized gas into the second sub-chamber during rotation of said piston head and thereby about the periphery of the piston head into the first sub-chamber to aerosolize the dry powder and direct same out of the aerosolizer through outlet means.

2. The aerosolizer of claim 1, wherein said rotating means includes an impulse type turbine wheel mounted for rotation in said hollow body to rotate a shaft extending through the turbine wheel and piston head, said outlet means being a flow control needle tube extending through the shaft in communication with said first sub-chamber.

3. The aerosolizer of claim 2, wherein said shaft is of non-circular cross-section interfitting within a hole of corresponding cross-section formed in the center of the turbine wheel.

4. The aerosolizer of claim 2, wherein said shaft is journaled within first and second bearings respectively positioned adjacent the turbine wheel and piston head.

5. The aerosolizer of claim 1, wherein said stirring means includes a series of wedges projecting outwardly at spaced locations from each other from a face of the piston head exposed to the first sub-chamber.

6. The aerosolizer of claim 1, further comprising an end cap mounted to one end of the hollow body to define said first sub-chamber with said piston head, said end cap being transparent to permit visual monitoring of the quantity of dry powder remaining in said first sub-chamber.

7. The aerosolizer of claim 6, further including a protective annular ring mounted to the inner periphery of the hollow body inwardly adjacent the transparent end cap to prevent the piston head from impacting against the end cap.

8. The aerosolizer of claim 4, wherein said second bearing means includes a first cylindrical bearing member of self-lubricating material mounted within said hollow body between the turbine wheel and piston head, and a second cylindrical bearing member of self-lubricating material mounted on said shaft to slidably interfit within said first bearing member.

9. The aerosolizer of claim 8, wherein said first and second bearing members are made of Teflon material or other self-lubricating material (graphite).

10. The aerosolizer of claim 3, wherein said shaft is of square cross-section.

11. The aerosolizer of claim 2, wherein said turbine wheel is a Pelton turbine wheel.

12. The aerosolizer of claim 2, further including first inlet means in said hollow body adjacent the turbine wheel for introducing a tangential flow of said pressurized gas against a series of vanes circumferentially disposed about the periphery of said turbine wheel.

13. The aerosolizer of claim 12, wherein said flow directing means is a second inlet means in said hollow body for introducing a flow of gas into said second sub-chamber.

14. The aerosolizer of claim 12, further comprising an input flow controller having a critical orifice and a use passage extending from said orifice to a pair of outlet passages in respective communication with said first and second inlet means in said aerosolizer.

15. The aerosolizer of claim 14, further including adjusting valve means disposed in said outlet passages for individual adjustment of the controlled flow rate through each outlet passage.

16. The aerosolizer of claim 15, further including a waste passage in communication with said use passage and critical orifice, including a resistive valve and a proportioning valve for controlling the flow rate of pressurized gas from said critical orifice into the use passage.

* * * * *